United States Patent
Ashikari et al.

(10) Patent No.: US 10,653,999 B2
(45) Date of Patent: May 19, 2020

(54) EXHAUST GAS PURIFYING CATALYST AND METHOD FOR PURIFYING EXHAUST GAS

(71) Applicant: Umicore Shokubai Japan Co., Ltd., Tokoname-shi, Aichi (JP)

(72) Inventors: Kenji Ashikari, Himeji (JP); Masanori Ikeda, Himeji (JP); Shigekazu Minami, Himeji (JP); Masashi Nakashima, Himeji (JP); Hideki Goto, Himeji (JP)

(73) Assignee: UMICORE SHOKUBAI JAPAN CO., LTD., Tokoname-Shi, Aichi (JP)

( * ) Notice: Subject to any disclaimer, the term of this patent is extended or adjusted under 35 U.S.C. 154(b) by 0 days.

(21) Appl. No.: 16/342,565

(22) PCT Filed: Oct. 18, 2017

(86) PCT No.: PCT/JP2017/037735
§ 371 (c)(1),
(2) Date: Apr. 17, 2019

(87) PCT Pub. No.: WO2018/074526
PCT Pub. Date: Apr. 26, 2018

(65) Prior Publication Data
US 2020/0047121 A1    Feb. 13, 2020

(30) Foreign Application Priority Data
Oct. 19, 2016   (JP) .................. 2016-205510

(51) Int. Cl.
*B01J 23/63*   (2006.01)
*F01N 3/10*   (2006.01)
*B01D 53/94*   (2006.01)

(52) U.S. Cl.
CPC ............ *B01D 53/945* (2013.01); *B01J 23/63* (2013.01); *F01N 3/10* (2013.01);
(Continued)

(58) Field of Classification Search
CPC ........... B01J 23/63; F01N 3/10; B01D 53/945
See application file for complete search history.

(56) References Cited

U.S. PATENT DOCUMENTS 5,102,639 A * 4/1992 Chou ................ B01J 23/63
                                                423/263
5,169,300 A * 12/1992 Chou ................ B01J 23/63
                                                423/453

(Continued)

FOREIGN PATENT DOCUMENTS

| CN | 101209417 B | 10/2010 |
| JP | H06-506907 A | 8/1994 |

(Continued)

OTHER PUBLICATIONS

International Search Report dated Jan. 9, 2018, by the Japanese Patent Office in corresponding International Patent Application No. PCT/JP2017/037735. (2 pages).

(Continued)

*Primary Examiner* — Cam N. Nguyen
(74) *Attorney, Agent, or Firm* — Buchanan Ingersoll & Rooney PC (57) ABSTRACT

The present invention provides an exhaust gas purifying catalyst which can maintain high catalyst activity even after the exhaust gas purifying catalyst is exposed to an exhaust gas at a high temperature for a long period of time. The exhaust gas purifying catalyst contains a Pd—Pr complex and PdO, and the Pd—Pr complex is represented by $Pr_a Pd_b O_c$, where $a=1$ to 3, $b=1$ to 10, and $c=1$ to 6.

6 Claims, 2 Drawing Sheets

(52) U.S. Cl.
CPC ............... *B01D 2255/1021* (2013.01); *B01D 2255/1023* (2013.01); *B01D 2255/2066* (2013.01); *B01D 2255/908* (2013.01)

(56) References Cited

U.S. PATENT DOCUMENTS

| | | | |
|---|---|---|---|
| 5,378,142 A * | 1/1995 | Kennelly | B01J 23/63 431/7 |
| 5,750,458 A * | 5/1998 | Kennelly | B01J 23/63 502/304 |
| 5,863,851 A * | 1/1999 | Kennelly | B01J 23/63 502/38 |
| 6,576,200 B1 | 6/2003 | Yamamoto et al. | |
| 7,674,746 B2 * | 3/2010 | Matsuo | B01J 23/63 502/333 |
| 7,811,960 B2 * | 10/2010 | Matsuo | B01D 53/945 502/303 |
| 9,012,353 B2 * | 4/2015 | Golden | F01N 3/101 502/258 |
| 2005/0153836 A1 * | 7/2005 | Matsuo | B01D 53/945 502/328 |
| 2008/0254977 A1 | 10/2008 | Matsuo et al. | |
| 2013/0236380 A1 | 9/2013 | Golden et al. | |

FOREIGN PATENT DOCUMENTS

| | | |
|---|---|---|
| JP | 2000-167404 A | 6/2000 |
| JP | 2007-105633 A | 4/2007 |
| JP | 2007-136327 A | 6/2007 |
| JP | 2013-166130 A | 8/2013 |
| JP | 2014-522725 A | 9/2014 |
| WO | 92/18243 A1 | 10/1992 |
| WO | 2006/033168 A1 | 3/2006 |

OTHER PUBLICATIONS

Notification of Transmittal of Translation of the International Preliminary Report on Patentability and Written Opinion dated Apr. 23, 2019, by the International Bureau of WIPO in corresponding International Patent Application No. PCT/JP2017/037735. (8 pages).
The extended European search report dated Sep. 25, 2019, by the European Patent Office in corresponding European Patent Application No. 17863165.1. (8 pages).
Jacob et al., "System Pr—Pd—O: Phase Diagram and Thermodynamic Properties of Ternary Oxides Using Solid-State Cells with Special Features," Zeitschrift für Metallkunde, (2001), vol. 92, No. 7, pp. 731-739.

* cited by examiner

FIG. 2

EXHAUST GAS PURIFYING CATALYST AND METHOD FOR PURIFYING EXHAUST GAS

TECHNICAL FIELD

The present invention relates to an exhaust gas purifying catalyst for purifying an exhaust gas of an internal combustion engine and to a method for purifying an exhaust gas using the exhaust gas purifying catalyst.

BACKGROUND ART

In recent years, the exhaust emission regulations for automobiles have been strengthened. In order to cope with this situation, exhaust gas purifying catalysts for purifying hydrocarbon (HC), carbon monoxide (CO), nitrogen oxide (NOx), and the like in exhaust gases have been developed.

For example, Patent Literature 1 discloses a catalyst which contains palladium and praseodymium oxide and is capable of maintaining and exhibiting excellent oxygen storage capabilities even in a high temperature atmosphere of 900° C. or higher.

Patent Literature 2 discloses a catalyst in which palladium oxide (PdO) particles having an average particle diameter of 1 nm or more and 50 nm or less and rare-earth oxide particles having an average particle diameter of 1 nm or more and 50 nm or less are supported on a carrier. By this catalyst, the temperature at which Pd is precipitated by decomposition of PdO is increased, and grain growth of Pd is inhibited even in a high temperature environment of 900° C., and thus a deterioration in the catalyst activity is prevented.

CITATION LIST

Patent Literature

[Patent Literature 1]
Japanese Patent Application Publication Tokukai No. 2000-167404
[Patent Literature 2]
Japanese Patent Application Publication Tokukai No. 2007-105633

SUMMARY OF INVENTION

Technical Problem

However, in the exhaust gas purifying catalyst disclosed in Patent Literature 1, praseodymium oxide and palladium exist in a state in which praseodymium oxide and palladium do not have a chemical bond with each other. Therefore, when the catalyst is exposed to an exhaust gas at a high temperature for a long period of time, precious metal particles (platinum, rhodium, and palladium) may be sintered, and this causes the problem of insufficient catalyst activity.

In addition, the exhaust gas purifying catalyst disclosed in Patent Literature 2 has the problem that PdO is not detected in a diffraction pattern of XRD and that the catalyst activity is not sufficient.

The present invention is accomplished in view of the above-described problems, and the main objective of the present invention is to provide an exhaust gas purifying catalyst capable of maintaining high catalyst activity even after being exposed to an exhaust gas at a high temperature for a long period of time, and to provide an exhaust gas purification method using said exhaust gas purifying catalyst.

Solution to Problem

In order to attain the objective, an exhaust gas purifying catalyst of the present invention contains a Pd—Pr complex and PdO, the Pd—Pr complex being represented by $Pr_a Pd_b O_c$, where a=1 to 3, b=1 to 10, and c=1 to 6.

Advantageous Effects of Invention

According to the present invention, it is possible to bring about an effect of providing an exhaust gas purifying catalyst capable of maintaining high catalyst activity over a long period of time, and providing an exhaust gas purification method using said exhaust gas purifying catalyst.

DESCRIPTION OF EMBODIMENTS

Hereinafter, embodiments of the present invention will be described in detail. However, the present invention is not limited to the following descriptions. "A to B" in this specification refers to "A or more and B or less". For example, "1 mass % to 30 mass %" or "1 to 30 mass %" in this specification refers to "1 mass % or more and 30 mass % or less." Moreover, "C and/or D" in this specification refers to including either one or both of C and D. Further, various types of physical properties described in this specification refer to values measured by methods described in Examples described later, unless otherwise specified.

The exhaust gas purifying catalyst of the present invention is characterized in that the exhaust gas purifying catalyst contains at least palladium (Pd) and praseodymium (Pr) together as catalyst components, at least a part of palladium forms a complex (Pd—Pr complex) with praseodymium, and the exhaust gas purifying catalyst further contains palladium oxide (PdO). Thus, in the exhaust gas purifying catalyst of the present invention, even after the exhaust gas purifying catalyst is exposed to an exhaust gas at a high temperature for a long period of time, aggregation of Pd particles is inhibited because the Pd—Pr complex is formed. As a result, the exhaust gas purifying catalyst of the present invention can cause Pd to adsorb exhaust gas even after exposure to exhaust gas at a high temperature for a long period of time (i.e., the exhaust gas purifying catalyst can maintain a high level of gas adsorption to Pd), and this makes it possible to maintain high catalyst activity over a long period of time. Note that, in this specification, a phrase "exposing the catalyst to a gas" means contacting the catalyst with the gas, and includes not only contacting the entire catalyst surface with the gas, but also contacting a part of the catalyst surface with the gas. In this specification, exposing the catalyst to a high temperature of 800° C. to 1200° C. is also referred to as "thermal aging treatment".

Moreover, it is preferable that the exhaust gas purifying catalyst of the present invention contains, in addition to the Pd—Pr complex and the PdO, an oxygen storage material, a refractory inorganic oxide, and an alkaline-earth metal compound, and optionally contains a precious metal, and these components are supported on (or coating) a refractory three dimensional structure. In the following description, the Pd—Pr complex, the oxygen storage material, the refractory inorganic oxide, the alkaline-earth metal compound, the palladium oxide (PdO), and the precious metal are sometimes collectively referred to as "catalyst component" (or "catalyst components").

(Refractory Three Dimensional Structure)

The refractory three dimensional structure is a structure for supporting the above described catalyst components. The refractory three dimensional structure used in the exhaust gas purifying catalyst of the present invention is not particularly limited, and a structure used in a conventional exhaust gas purifying catalyst can be suitably employed. Preferably, the refractory three dimensional structure is a honeycomb substrate. Examples of the honeycomb substrate include a monolith honeycomb substrate, a metallic honeycomb substrate, a plug honeycomb substrate such as a particulate filter, and the like. The honeycomb substrate may be formed of a heat-resistant metal such as cordierite, silicon carbide, silicon nitride, a heat-resistant metal such as an Fe—Cr—Al alloy, or a heat-resistant material such as stainless steel.

These honeycomb substrates can be produced by an extrusion molding method, a method of winding and solidifying a sheet-like element, and the like. The shape (i.e., cell shape) of a gas-passage port of the honeycomb substrate may be hexagonal, quadrangular, triangular, or corrugated. A honeycomb substrate having a cell density (i.e., the number of cells per unit cross-sectional area) of 100 to 1200 cells/sq. in. (i.e., 15.5 to 186 cells/cm$^2$) is sufficiently usable, and a preferable cell density is 200 to 900 cells/sq. in. (i.e., 31 to 139.5 cells/cm$^2$).

The total length of the refractory three dimensional structure is preferably 10 to 1000 mm, more preferably 15 to 300 mm, further preferably 30 to 200 mm.

(Pd—Pr Complex)

The complex (Pd—Pr complex) of palladium (Pd) and praseodymium (Pr) of the present invention refers to a complex constituted by a compound containing at least two of palladium (Pd), praseodymium (Pr), and oxygen (O). Note that the compound should not contain palladium oxide (PdO) and palladium dioxide (PdO$_2$). The Pd—Pr complex may be constituted by one of the above compounds, or may be constituted by two or more of the above compounds. In a case where the Pd—Pr complex is represented by $Pr_aPd_bO_c$, a=1 to 3, b=1 to 10, c=1 to 6, preferably a=1 to 2, b=2 to 5, c=1 to 4, more preferably a=2, b=3 to 5, c=1 to 2, further preferably a=2, b=5, and c=2 (i.e., $Pr_2Pd_5O_2$), and most preferably $Pr_2Pd_5O_2$ in a rational formula. If a is larger than 3, a large amount of expensive praseodymium is unfavorably used. If b is larger than 10, a large amount of expensive palladium is unfavorably used. If c is larger than 6, reduction performance of nitrogen monoxide unfavorably deteriorates. Meanwhile, If a is smaller than 1, b is smaller than 1, or c is smaller than 1, thermal durability deteriorates unfavorably.

In the exhaust gas purifying catalyst of the present invention, the mass ratio of praseodymium and palladium, which is respectively calculated in terms of $Pr_6O_{11}$ and in terms of Pd, is preferably 0.05 to 2.0, more preferably 0.05 to 1.9, further preferably 0.1 to 1.5, and most preferably 0.2 to 1.0.

If the mass ratio of praseodymium to palladium is lower than 0.05, a Pd—Pr complex is unfavorably difficult to form. If the mass ratio of praseodymium to palladium is higher than 2.0, a large amount of expensive praseodymium is unfavorably used.

Formation of the Pd—Pr complex can be confirmed and the Pd—Pr complex can be identified with use of known methods and, in this specification, X-ray diffractometry (XRD) is used. Note that, in this specification, it is assumed that the X-ray source in the XRD is a CuKα ray.

As described above, the exhaust gas purifying catalyst of the present invention includes PdO, as well as the Pd—Pr complex. Formation of the PdO can also be confirmed by X-ray diffractometry.

In the exhaust gas purifying catalyst of the present invention, it is preferable that the abundance ratio of the Pd—Pr complex to the PdO is within a predetermined range. Here, in this specification, the abundance ratio of the Pd—Pr complex to the PdO is defined by a ratio $C_{compo}$ of the intensity ($I_{PrPdO}$) of an X-ray at a specific diffraction angle with respect to the Pd—Pr complex to the intensity ($I_{PdO}$) of an X-ray at a specific diffraction angle with respect to the PdO in the X-ray diffractometry (that is, defined by the following formula (1)).

$$C_{compo} = I_{PrPdO}/I_{PdO} \qquad (1)$$

Here, the specific diffraction angle of the PdO and the specific diffraction angle of the Pd—Pr complex which are used to calculate the ratio $C_{compo}$ are respectively angles which do not overlap each other in an X-ray diffraction pattern and at which strongest intensities are obtained. For example, in a case where the Pd—Pr complex is composed of only $Pr_2Pd_5O_2$, the ratio $C_{compo}$ can be calculated by intensity ($I_{PrPdO}$) at 2θ=31.49° with respect to the $Pr_2Pd_5O_2$ to intensity ($I_{PdO}$) at 2θ=33.29° with respect to the PdO. Note that the diffraction angles in the X-ray diffractometry contain errors, and therefore the diffraction angles at the intensity $I_{PdO}$ and the intensity $I_{PrPdO}$ are respective diffraction angles obtained by correcting said errors. Further, the intensity $I_{PdO}$ and the intensity $I_{PrPdO}$ are respective intensities obtained at the corrected diffraction angles.

In the exhaust gas purifying catalyst of the present invention, the ratio $C_{compo}$ is preferably in a range from 0.04 to 1.1, more preferably in a range from 0.07 to 0.8, and most preferably in a range from 0.1 to 0.6. If the ratio $C_{compo}$ is lower than 0.04, the proportion of the Pd—Pr complex is low, and therefore an effect of the Pd—Pr complex cannot unfavorably be sufficiently attained. If the ratio $C_{compo}$ is higher than 1.1, the proportion of the PdO is low and therefore the catalyst performance unfavorably deteriorates.

As described above, the exhaust gas purifying catalyst of the present invention includes the PdO as well as the Pd—Pr complex. "Including the PdO as well as the Pd—Pr complex" may be a state in which the PdO is formed on surfaces of Pd—Pr complex particles, a state in which PdO particles exist independently of Pd—Pr complex particles, or a state in which the PdO is formed on surfaces of Pd—Pr complex particles and PdO particles exist independently of the Pd—Pr complex particles. Preferably, "including the PdO as well as the Pd—Pr complex" is a state in which PdO particles exist independently of Pd—Pr complex particles or a state in which the PdO is formed on surfaces of Pd—Pr complex particles and PdO particles exist independently of the Pd—Pr complex particles, and more preferably a state in which the PdO is formed on surfaces of Pd—Pr complex particles and PdO particles exist independently of the Pd—Pr complex particles.

Locations where the Pd—Pr complex particles and PdO particles exist can be found, for example, by electron microscopy with an energy dispersive X-ray detector such as a transmission electron microscope with energy dispersive X-ray spectroscopy (TEM-EDX) or a transmission electron microscope with energy dispersive spectroscopy (TEM-EDS). Specifically, in a case where Pr and oxygen (O) are detected at the same location as particles in which Pd is detected and Pr is not detected and Pd and O are detected in particles different from the particles in which Pd and Pr are both detected during the electron microscopy surface analysis with the energy-dispersive X-ray detector, the PdO particles exist independently of the Pd—Pr complex particles. In a case where O intensity at the outer periphery of a Pd—Pr complex particle is higher than O intensity at the center of the Pd—Pr complex particle and Pr intensity at the outer periphery is lower than Pr intensity at the center in point analyses of the outer surface and the center of the Pd—Pr complex particle, PdO is formed on the surface of the Pd—Pr complex particle.

In the exhaust gas purifying catalyst of the present invention, aggregation of Pd particles is inhibited by formation of the Pd—Pr complex, and consequently an exhaust gas can be adsorbed onto Pd even after the exhaust gas purifying catalyst is exposed to the exhaust gas at a high temperature for a long period of time. The amount of gas adsorbed onto Pd can be measured by the $O_2$—$CO_2$—$H_2$—CO pulse adsorption method (Reference Literature; Applied Catalysis A, 2005, vol. 293). A Pd particle diameter can be calculated from the CO adsorption amount obtained by the $O_2$—$CO_2$—$H_2$—CO pulse adsorption method (Reference Literature; SHOKUBAI (Catalyst), 1986, Vol. 28, No. 1).

A starting material of palladium (i.e., palladium source) in the exhaust gas purifying catalyst of the present invention is not particularly limited, and a raw material used in a conventional exhaust gas purifying catalyst can be used. Specifically, examples of the palladium source include palladium; halide such as palladium chloride; mineral salts such as nitrate, sulfate, acetate, ammonium salt, amine salt, tetraammine salt, carbonate, bicarbonate, nitrite, and oxalate; carboxylate such as formate; hydroxide; alkoxide; and oxide. Among these, nitrate, acetate, ammonium salt, amine salt, tetraammine salt, and carbonate are preferable, nitrate (palladium nitrate), chloride (palladium chloride), acetate (palladium acetate), tetraammine salt (tetraammine palladium) are more preferable, and palladium nitrate is further preferable. The amount of palladium supported on the refractory three dimensional structure is, in terms of Pd, preferably 0.1 to 15 g, more preferably 0.2 to 10 g, further preferably 0.5 to 10 g. In production of the exhaust gas purifying catalyst, a palladium source is used so that the supported amount of palladium with respect to the refractory three dimensional structure falls within the above described range. Note that, as the palladium source, one kind of palladium source may be used, or two or more kinds of palladium sources may be used in combination.

A starting material of praseodymium (i.e., praseodymium source) in the exhaust gas purifying catalyst of the present invention is not particularly limited, and a raw material used in a conventional exhaust gas purifying catalyst can be used. Specific examples of the praseodymium source include praseodymium nitrate, praseodymium carbonate, praseodymium acetate, praseodymium phosphate, and praseodymium sol. Among these, praseodymium nitrate, praseodymium carbonate, praseodymium acetate, and praseodymium sol are preferable, praseodymium nitrate, praseodymium carbonate, and praseodymium sol are more preferable, and praseodymium nitrate and praseodymium sol are further preferable. The praseodymium sol is a sol obtained by dispersing praseodymium oxide in a solvent such as water or ethanol containing an acid such as nitric acid, sulfuric acid, hydrochloric acid, acetic acid, oxalic acid, or citric acid. The solvent preferably contains acetic acid, nitric acid, or sulfuric acid, and more preferably contains acetic acid. The praseodymium sol preferably has a pH in a range from 7 to 10. In production of the exhaust gas purifying catalyst, a praseodymium source is used so that the supported amount of praseodymium with respect to the refractory three dimensional structure falls within the above described range. Note that, as the praseodymium source, one kind of praseodymium source may be used, or two or more kinds of praseodymium sources may be used in combination.

(Precious Metal)

In addition to palladium (palladium oxide), the exhaust gas purifying catalyst of the present invention preferably contains other precious metals. The other precious metals may be precious metals which are used in a conventional exhaust gas purifying catalyst, and the exhaust gas purifying catalyst preferably further contains at least one precious metal of rhodium (Rh) and platinum (Pt). In the exhaust gas purifying catalyst of the present invention, as the other precious metal, a single precious metal may be used, or precious metals may be used in combination. In cases where the exhaust gas purifying catalyst comprises multiple catalyst layers, the same precious metal may be used for all catalyst layers, or different precious metals may be used for the respective catalyst layers.

The quantity of rhodium used in the exhaust gas purifying catalyst of the present invention is not particularly limited and is, in terms of Rh, preferably 0.001 to 1 g, more preferably 0.1 to 0.5 g per liter of the refractory three dimensional structure. The amount of platinum used in the exhaust gas purifying catalyst of the present invention is, in terms of Pt, preferably 0.1 to 5 g, more preferably 0.2 to 4 g, and most preferably 0.5 to 3 g.

A starting material (i.e., rhodium source) of rhodium in the exhaust gas purifying catalyst of the present invention is not particularly limited, and a raw material used in a conventional exhaust gas purifying catalyst can be used. Specifically, examples of the rhodium source include rhodium; halide such as rhodium chloride; mineral salts such as nitrate, sulfate, acetate, ammonium salt, amine salt, hexaammine salt, carbonate, bicarbonate, nitrite, and oxalate; carboxylate such as formate; hydroxide; alkoxide; and oxide. Among these, nitrate, ammonium salt, amine salt, and carbonate are preferable, nitrate (rhodium nitrate), chloride (rhodium chloride), acetate (rhodium acetate), and hexaammine salt (hexaammine rhodium) are more preferable, and rhodium nitrate is further preferable. In production of the exhaust gas purifying catalyst, a rhodium source is used so that a supported amount of rhodium with respect to the refractory three dimensional structure falls within the above described range. Note that, as the rhodium source, one kind of rhodium source may be used, or two or more kinds of rhodium sources may be used in combination.

A starting material of platinum (i.e., platinum source) in the exhaust gas purifying catalyst of the present invention is not particularly limited, and a raw material used in a conventional exhaust gas purifying catalyst can be used. Specifically, examples of the platinum source include platinum; halide such as platinum bromide and platinum chloride; mineral salts such as nitrate, dinitrodiamine salt, tetraammine salt, sulfate, ammonium salt, amine salt, bisethanolamine salt, bisacetylacetonate, carbonate, bicarbonate, nitrite, and oxalate; carboxylate such as formate; hydroxide; alkoxide; and oxide. Among these, nitrate (platinum nitrate), dinitrodiammine salt (dinitrodiammine platinum), chloride (platinum chloride), tetraammine salt (tetraammine platinum), bisethanolamine salt (bisethanolamine platinum), and bisacetylacetonate (bisacetylacetonate platinum) are preferable, and nitrate and dinitrodiammine salt are more preferable. In production of the exhaust gas purifying catalyst, a platinum source is used so that a supported amount of platinum with respect to the refractory three dimensional structure falls within the above described range. Note that one kind of platinum source may be used as the platinum source, or two or more kinds of platinum sources may be used in combination.

(Oxygen Storage Material)

A cerium-zirconium complex oxide can be used as the oxygen storage material in the exhaust gas purifying catalyst of the present invention. The cerium-zirconium complex oxide may contain lanthanum, yttrium, neodymium, and praseodymium other than a Pd—Pr complex oxide. The oxygen storage material is preferably a cerium-zirconium complex oxide, a cerium-zirconium-lanthanum complex oxide, or a cerium-zirconium-lanthanum yttrium complex oxide, more preferably a cerium-zirconium-lanthanum complex oxide or a cerium-zirconium-lanthanum yttrium complex oxide. The added amount of the oxygen storage material is, in terms of oxide ($CeO_2$, $ZrO_2$, $La_2O_3$, $Y_2O_3$, $Nd_2O_5$, or $Pr_6O_{11}$), preferably 5 to 200 g, more preferably 5 to 100 g, further preferably 5 to 50 g per liter of the refractory three dimensional structure.

A starting material of cerium (i.e., cerium raw material) used as the oxygen storage material in the exhaust gas purifying catalyst of the present invention is not particularly limited, and a raw material used in a conventional exhaust gas purifying catalyst can be used. Specifically, examples of the cerium raw material include nitrate such as cerium nitrate, carbonate, and sulfate. Among these, nitrate is preferable. Note that, as the cerium raw material, one kind of cerium raw material may be used, or two or more kinds of cerium raw materials may be used in combination. The added amount of the cerium raw material is, in terms of cerium oxide ($CeO_2$), preferably 5 to 200 g, more preferably 5 to 100 g, further preferably 5 to 50 g per liter of the refractory three dimensional structure.

A starting material of zirconium (i.e., zirconium raw material) used as the oxygen storage material in the exhaust gas purifying catalyst of the present invention is not particularly limited, and a raw material used in a conventional exhaust gas purifying catalyst can be used. Specific examples of the zirconium raw material include zirconium oxynitrate, zirconium oxychloride, zirconium nitrate, and basic zirconium sulfate. Among these, zirconium oxynitrate or zirconium nitrate is preferable. Note that, as the zirconium raw material, one kind of zirconium raw material may be used, or two or more kinds of zirconium raw materials may be used in combination.

The added amount of the zirconium raw material is, in terms of zirconium oxide ($ZrO_2$), preferably 5 to 200 g, more preferably 10 to 150 g, further preferably 20 to 100 g per liter of the refractory three dimensional structure.

A starting material of lanthanum (i.e., lanthanum raw material) in the exhaust gas purifying catalyst of the present invention is not particularly limited, and a raw material used in a conventional exhaust gas purifying catalyst can be used. Specific examples of the lanthanum raw material include lanthanum hydroxide, lanthanum nitrate, lanthanum acetate, and lanthanum oxide. Among these, lanthanum nitrate or lanthanum hydroxide is preferable. Note that, as the lanthanum raw material, one kind of lanthanum raw material may be used, or two or more kinds of lanthanum raw materials may be used in combination. The added amount of the lanthanum raw material is, in terms of lanthanum oxide ($La_2O_3$), preferably 1 to 50 g, more preferably 1 to 35 g, further preferably 1 to 20 g per liter of the refractory three dimensional structure.

A starting material of yttrium (i.e., yttrium raw material) in the exhaust gas purifying catalyst of the present invention is not particularly limited, and a raw material used in a conventional exhaust gas purifying catalyst can be used. Specific examples of the yttrium raw material include yttrium hydroxide, yttrium nitrate, yttrium oxalate, and yttrium sulfate. Among these, yttrium hydroxide or yttrium nitrate is preferable. Note that, as the yttrium raw material, one kind of yttrium raw material may be used, or two or more kinds of yttrium raw materials may be used in combination. The added amount of the yttrium raw material is, in terms of yttrium oxide ($Y_2O_3$), preferably 0 to 50 g, more preferably 0 to 35 g, and further preferably 0 to 20 g per liter of the refractory three dimensional structure.

A starting material of neodymium (i.e., neodymium raw material) in the exhaust gas purifying catalyst of the present invention is not particularly limited, and a raw material used in a conventional exhaust gas purifying catalyst can be used. Specific examples of the neodymium raw material include neodymium hydroxide, neodymium nitrate, neodymium oxalate, and neodymium sulfate. Among these, neodymium hydroxide or neodymium nitrate is preferable. As the neodymium raw material, one kind of neodymium raw material may be used, or two or more kinds of neodymium raw materials may be used in combination. The added amount of the neodymium raw material is, in terms of neodymium oxide ($Nd_2O_5$), preferably 0 to 50 g, more preferably 0 to 35 g, further preferably 0 to 20 g per liter of the refractory three dimensional structure.

A crystal structure of the above described oxygen storage material can be cubic crystal, tetragonal crystal, monoclinic crystal, orthorhombic crystal, or the like, and is preferably cubic crystal, tetragonal crystal, or monoclinic crystal, more preferably cubic crystal or tetragonal crystal.

(Refractory Inorganic Oxide)

The refractory inorganic oxide has a high specific surface area, and serves as a carrier for increasing the contact area between the other catalyst components (i.e., the Pd—Pr complex, the precious metal, the oxygen storage material, and the alkaline-earth metal compound) and a gas by supporting those catalyst components. The refractory inorganic oxide is supported on (i.e., coats) the refractory three dimensional structure.

In the refractory inorganic oxide used in the exhaust gas purifying catalyst of the present invention, it is preferable that a change in the specific surface area is small at 700° C. or higher, preferably 1000° C. or higher. A BET specific surface area of the refractory inorganic oxide is not particularly limited, and is preferably 50 to 750 m$^2$/g, more preferably 150 to 750 m$^2$/g, from the viewpoint of supporting the catalyst components.

The refractory inorganic oxide used in the exhaust gas purifying catalyst of the present invention can have any shape, for example, granular, particulate, powdery, cylindrical, conical, prismatic, cubic, pyramidal, indefinite, or the like, and is preferably granular, particulate, or powdery, more preferably powdery. If the refractory inorganic oxide is granular, particulate, or powdery, an average primary particle diameter of the refractory inorganic oxide is not particularly limited and is preferably in a range from 5 nm to 20 nm, more preferably in a range from 5 nm to 10 nm. Within these ranges, the catalyst components can be supported on the refractory inorganic oxide. The shape or the average primary particle diameter of the refractory inorganic oxide of the present invention can be measured by a known method such as a method using transmission electron microscopy (TEM).

The refractory inorganic oxide used in the exhaust gas purifying catalyst of the present invention has a melting point of preferably 1000° C. or higher, more preferably 1000 to 3000° C., further preferably 1500° C. to 3000° C.

Examples of the above described preferable refractory inorganic oxide include a-alumina, active alumina such as γ, δ, η, and θ, lanthanum-containing alumina (lanthana-alumina), silica, zeolites, titania, zirconia, titania, silicon oxide, and the like. Among these, active alumina is preferable. Note that, as the refractory inorganic oxide, one kind of refractory inorganic oxide may be used, or two or more kinds of refractory inorganic oxides may be used in combination. Examples of the combination of two or more kinds of refractory inorganic oxides include alumina-titania, alumina-zirconia, titania-zirconia, and the like.

The exhaust gas purifying catalyst of the present invention may be in the form of a refractory inorganic oxide on which the other catalyst components are supported. It is preferable that the refractory inorganic oxide on which the other catalyst components are supported is supported on the refractory three dimensional structure. The amount of the refractory inorganic oxide used in a case where the refractory inorganic oxide is supported on the refractory three dimensional structure is not particularly limited, and is preferably 10 to 300 g, more preferably 50 to 200 g per liter of the refractory three dimensional structure. If the used amount of the refractory inorganic oxide per liter of the refractory three dimensional structure is less than 10 g, the precious metal cannot be sufficiently dispersed and sufficient durability may not be achieved. Meanwhile, if the used amount of the refractory inorganic oxide per liter of the refractory three dimensional structure exceeds 300 g, contact between the precious metal and an exhaust gas may deteriorate, and the catalyst performance may not be sufficiently obtained.

In the above description, as the form of the exhaust gas purifying catalyst, the form is exemplified in which the refractory inorganic oxide on which the other catalyst components are supported is supported on the refractory three dimensional structure. However, the form of the exhaust gas purifying catalyst of the present invention is not limited to this. For example, an embodiment of the exhaust gas purifying catalyst of the present invention may have a form in which the refractory inorganic oxide after molding forms a honeycomb structure by molding the refractory inorganic oxide on which the other catalyst components are supported.

(Alkaline-Earth Metal Compound)

The alkaline-earth metal compound is used to inhibit reduction of palladium oxide to metallic palladium at a high temperature. The alkaline-earth metal compound used in the exhaust gas purifying catalyst of the present invention may be in a form of oxide, sulfate, carbonate, nitrate, and the like of alkaline-earth metals (magnesium, calcium, strontium, barium, and the like), and may preferably be a compound that becomes an oxide, sulfate, or carbonate after calcination during the production of the exhaust gas purifying catalyst. Among these, barium sulfate ($BaSO_4$) as the barium sulfate is employed. Note that, as the alkaline-earth metal compound, one kind of alkaline-earth metal compound may be used, or two or more kinds of alkaline-earth metal compounds may be used in combination. When $BaSO_4$ is used as the alkaline-earth metal compound, the amount of the $BaSO_4$ used is, in terms of $BaSO_4$, preferably 0 to 50 g, more preferably 0.5 to 30 g, and further preferably 0.5 to 20 g per liter of the refractory three dimensional structure.

<Method for Producing Catalyst of the Present Invention>

The method for producing the exhaust gas purifying catalyst of the present invention is not particularly limited, provided that the effects of the present invention can be brought about. A known method can be used, but it is preferable to use a method including (a) a slurry preparation step, (b) a slurry application step, and (c) a dry and calcination step, which will be described later. The following description will discuss the steps (a) through (c) in detail.

(a) Slurry Preparation Step

The slurry preparation step is a step of preparing a slurry containing materials to become the above described catalyst components (i.e., the Pr—Pd complex, the PdO, the precious metal, the refractory inorganic oxide, the oxygen storage material, and the alkaline-earth metal compound) after the dry and calcination step described later. The slurry is prepared by mixing the starting materials of the catalyst components in an aqueous medium and subjecting the resulting mixture to wet milling.

Here, as the above described aqueous medium, water (pure water), a lower alcohol (such as ethanol or 2-propanol), an organic alkaline aqueous solution, or the like can be used. It is preferable to use water or a lower alcohol, and it is further preferable to use water. The slurry is prepared so that the amount of solids in the slurry becomes preferably 5 to 60 mass %, more preferably to 50 mass %. The wet milling is not particularly limited, and a known method can be used. As the wet milling, for example, milling using a ball mill can be employed.

In the slurry preparation step, it is preferable to mix the starting material of palladium and the starting material of praseodymium in advance before mixing those starting materials in the aqueous medium, and then to add the starting material of palladium and the starting material of praseodymium, which have been mixed, to the aqueous medium in which a complex forming material (described later) is dispersed, and to then stir the mixture thus obtained. This allows a precursor of the Pd—Pr complex to be formed in the aqueous medium. As a result, the Pd—Pr complex can be formed by carrying out heat treatment in the dry and calcination step, and the PdO can be formed on surfaces of the Pd—Pr complex particles. Further, PdO particles can be formed independently of the Pd—Pr complex particles during the above heat treatment. As the complex forming material, a forming material exhibiting reducibility is preferable, and a reducing saccharide such as acetic acid, hydrazine, sodium borohydride, or glucose is preferable. Note that the Pd—Pr complex can be formed by heat-treating a solution containing the precursor of the Pd—Pr complex at 100° C. to 1000° C., preferably 120° C. to 900° C., more preferably 120° C. to 600° C., most preferably 120° C. to 550° C., to remove solution component such as the aqueous medium.

Alternatively, in a case where praseodymium sol which can form a complex with Pd is used, the precursor of the Pd—Pr complex can be formed by mixing and stirring a Pd raw material and praseodymium sol for 5 minutes to 24 hours, without adding a complex forming material.

After the precursor of the Pd—Pr complex is thus formed in the aqueous medium, it is possible to further add the oxygen storage material, the refractory inorganic oxide, and the alkaline-earth metal compound to the aqueous medium. A slurry containing these catalyst components can be stirred for 5 minutes to 24 hours, and then be subjected to wet milling. In a case where the pH of a slurry immediately before wet milling changes by ±5 or more, preferably by ±3 or more with respect to the pH of a slurry in which the precursor has been formed, the wet milling can be carried out after the pH is returned, with use of an acid such as acetic acid or nitric acid or of a base such as ammonia, to less than ±5, preferably less than ±3 with respect to the pH obtained when the precursor had been formed.

In another slurry preparation step, it is possible that the refractory inorganic oxide is added to an aqueous medium, the mixture thus obtained is stirred for 5 minutes to 24 hours, then the Pd—Pr complex which had been formed in advance in an aqueous medium is added to the mixture, then the mixture thus obtained is stirred for 5 minutes to 24 hours, and then the oxygen storage material and the alkaline earth compound are added to the mixture.

After that, wet milling can be carried out in a manner similar to the one above described.

Note that, in the exhaust gas purifying catalyst of the present invention, two catalyst layers (hereinafter referred to as "lower catalyst layer" and "upper catalyst layer", respectively) may be formed on the refractory three dimensional structure. In this case, in the slurry preparation step, a first slurry for forming the lower catalyst layer and a second slurry for forming the upper catalyst layer are prepared. The first slurry and the second slurry may contain different precious metals respectively. Specifically, for example, the first slurry and the second slurry are prepared so that one slurry contains palladium (palladium oxide) and that the other contains rhodium or platinum.

(b) Slurry Application Step

The slurry application step is a step of applying the slurry, which had been prepared in the slurry preparation step, to the refractory three dimensional structure. A specific method of applying the slurry to the refractory three dimensional structure is not particularly limited, and a known method can be used. The applied amount of the slurry is not particularly limited and may be determined depending on the amount of solids in the slurry and on the thickness of the catalyst layer to be formed.

(c) Dry and Calcination Step

The dry and calcination step is a step of drying and calcining the refractory three dimensional structure to which the slurry had been coated in the slurry application step, and includes a drying step of drying the slurry applied to the refractory three dimensional structure and a calcination step of calcining the slurry dried in the drying step. Note, however, that, in the dry and calcination, the drying step and the calcination step may be carried out in a single heat treatment without being distinguished as separate steps, as long as the catalyst components can be supported on the refractory three dimensional structure.

In the drying step, the slurry is dried, in air, at a temperature of preferably 50 to 300° C., more preferably 80 to 200° C., for 5 minutes to 10 hours, preferably 30 minutes to 8 hours.

In the calcination step, the slurry dried in the drying step is calcined, in air, at a temperature of 300 to 1200° C., preferably 400 to 700° C., for 10 minutes to 10 hours, preferably 30 minutes to 5 hours.

In a case where two catalyst layers are formed on the refractory three dimensional structure, the first slurry is applied to the refractory three dimensional structure, then the dry and calcination is carried out, then the second slurry is further applied to the refractory three dimensional structure, and then the dry and calcination is carried out. Thus, an exhaust gas purifying catalyst can be produced in which two layers, i.e., a lower catalyst layer and an upper catalyst layer are provided on the refractory three dimensional structure. In a case where a thick catalyst layer is to be formed on the refractory three dimensional structure, the above steps (a) through (c) may be carried out repeatedly.

<Method for Purifying Exhaust Gas of the Present Invention>

The present invention also provides a method for purifying an exhaust gas, i.e. a method for purifying an exhaust gas in a high temperature zone. The method includes purifying, with use of the exhaust gas purifying catalyst of the present invention, nitrogen oxide, carbon monoxide, and hydrocarbon in an exhaust gas in the high temperature zone of an internal combustion engine.

In the exhaust gas purification method of the present invention, the method for exposing the exhaust gas purifying catalyst to an exhaust gas is not particularly limited and can be carried out, for example, by providing the exhaust gas purifying catalyst in an exhaust flow path of an exhaust port of an internal combustion engine and causing an exhaust gas to flow through the exhaust flow path.

The exhaust gas to be subjected to the exhaust gas purification method of the present invention is not particularly limited, provided that the exhaust gas is an exhaust gas of an internal combustion engine. The exhaust gas can be, for example, an exhaust gas containing, in any proportion, nitrogen oxide (e.g., NO, $NO_2$, $N_2O$), carbon monoxide, carbon dioxide, oxygen, hydrogen, ammonia, water, sulfur dioxide, and hydrocarbons in general.

The internal combustion engine to which the exhaust gas purification method of the present invention is applied is not particularly limited, and examples of an internal combustion engine include a gasoline engine, a hybrid engine, and engines using, as fuels, natural gas, ethanol, dimethyl ether, and the like. Among these, the gasoline engine is preferable.

In the exhaust gas purification method of the present invention, the time during which the exhaust gas purifying catalyst is exposed to an exhaust gas is not particularly limited, provided that a time is sufficient for causing the exhaust gas purifying catalyst to at least partially contact with the exhaust gas.

The temperature of the exhaust gas is not particularly limited and is preferably 0° C. to 800° C., that is, within a temperature range of the exhaust gas during normal operation of an internal combustion engine. Here, the air-fuel ratio in the exhaust gas of the internal combustion engine having a temperature of 0° C. to 800° C. is 10 to 30, preferably 11 to 14.7.

In the exhaust gas purification method of the present invention, the exhaust gas purifying catalyst may be exposed to an exhaust gas in a high temperature zone having a temperature of 800 to 1200° C. Here, the air-fuel ratio of the exhaust gas having the temperature of 800 to 1200° C. is preferably 10 to 18.6. Moreover, the time during which the exhaust gas purifying catalyst is exposed to the exhaust gas having the temperature of 800° C. to 1200° C. is not particularly limited, and may be, for example, 5 to 500 hours.

Note that the temperature of the exhaust gas is the temperature of the exhaust gas at the catalyst inlet. In this specification, the term "catalyst inlet" refers to a part of an exhaust pipe in which the exhaust gas purifying catalyst is provided. This part of the exhaust pipe has a length of 20 cm from the internal combustion engine side to the catalyst end surface on the exhaust gas inflow side, and is at the center of the exhaust pipe in the longitudinal direction (i.e., an axial direction) of the exhaust pipe. Moreover, in this specification, the term "catalyst bed" refers to the central part which is located between the catalyst end surface on the exhaust gas inflow side of the exhaust pipe and the catalyst end surface on the exhaust gas outflow side and is located at a center of a cross-section of the exhaust pipe (in a case where the cross-section of the exhaust pipe is not circular, at the center of gravity of the cross-section of the exhaust pipe).

The present invention is not limited to the embodiments, but can be altered by a skilled person in the art within the scope of the claims. The present invention also encompasses, in its technical scope, any embodiment derived by combining technical means disclosed in different embodiments.

EXAMPLES

The following description will discuss effects of the exhaust gas purifying catalyst of the present invention, with reference to Examples 1 through 5 and Comparative Examples 1 and 2 below. Each of the examples below merely shows an example of the exhaust gas purifying catalyst of the present invention and does not limit the technical scope of the exhaust gas purifying catalyst of the present invention. Note that ratios in the examples below represent mass ratios, unless otherwise specified.

Example 1

In preparation of an exhaust gas purifying catalyst in this Example, first, an aqueous palladium nitrate solution, praseodymium nitrate, lanthana-alumina (containing 4 mass % of $La_2O_3$ in lanthana-alumina; the same applies hereinafter), ceria-zirconia ($CeO_2:ZrO_2=45:55$), and barium sulfate were weighed so that the mass ratio became as follows: Pd:$Pr_6O_{11}$:lanthana-alumina:ceria-zirconia:$BaSO_4$=6:1.2:56:40:12. From this, in this Example, the mass ratio between $Pr_6O_{11}$ and Pd ($Pr_6O_{11}$/Pd) is 0.2.

The weighed lanthana-alumina was then dispersed in pure water (in an amount equivalent to twice the mass of the lanthana-alumina). Acetic acid in an amount equivalent to 0.3 times the mass of palladium was added to the dispersed liquid as a complex forming material. Next, a mixture of an aqueous palladium nitrate solution and praseodymium nitrate which were mixed in advance was added to the dispersed liquid, and the mixture was stirred for 10 minutes. The weighed ceria-zirconia and barium sulfate were then added to the solution, and the solution was subjected to wet milling in a ball mill. Thus, the first slurry a1 was prepared.

Next, an aqueous rhodium nitrate solution, lanthana-alumina, and ceria-zirconia ($CeO_2:ZrO_2=20:80$) were weighed so that the mass ratio became as follows: Rh:lanthana-alumina:ceria-zirconia=1:40:40. The weighed lanthana-alumina and ceria-zirconia were dispersed in pure water (in an amount equivalent to twice the mass of the lanthana-alumina). The aqueous rhodium nitrate solution was added to this dispersed liquid, and the dispersed liquid was stirred for 10 minutes. Then, the solution thus obtained was subjected to wet milling in a ball mill, and thus the second slurry a2 was prepared.

Next, the first slurry a1 was applied to a cylindrical cordierite substrate (having a diameter of 105.7 mm, a length of 91 mm, a volume of 0.8 liters, 900 cells/sq. in. (i.e., 139.5 cells/cm$^2$), a cell wall thickness of 2.5 mil (i.e., 0.0635 mm)) as a refractory three dimensional structure so that the total supported amount of catalyst components after calcining became 115.2 g per liter of the refractory three dimensional structure in terms of Pd, $Pr_6O_{11}$, $La_2O_3$, $Al_2O_3$, $CeO_2$, $ZrO_2$, and $BaSO_4$. The first slurry a1 thus applied was dried at 150° C. for 15 minutes, and then calcined at 550° C. for 30 minutes. As a result, a cordierite substrate in which the lower catalyst layer A1 was formed was obtained.

Next, the second slurry a2 was applied to the lower catalyst layer A1 so that a total supported amount of catalyst components after calcining became 81 g per liter of the refractory three dimensional structure in terms of Rh, $La_2O_3$, $Al_2O_3$, $CeO_2$, and $ZrO_2$, and the second slurry a2 thus applied was dried and calcined under similar conditions. Thus, an exhaust gas purifying catalyst (hereinafter referred to as "catalyst A") was obtained in which the lower catalyst layer A1 and the upper catalyst layer A2 were formed on the cordierite substrate.

Example 2

In this Example, an exhaust gas purifying catalyst (hereinafter referred to as "catalyst B"), in which the lower catalyst layer B1 (in an amount of 117 g per liter of the refractory three dimensional structure) and the upper catalyst layer A2 (in an amount of 81 g per liter of the refractory three dimensional structure) were formed on a cordierite substrate, was obtained in a manner similar to that in Example 1, except that the ingredients for preparing the first slurry 1 were weighed so that the mass ratio became as follows: Pd:$Pr_6O_{11}$:lanthana-alumina:ceria-zirconia:$BaSO_4$=6:3:56:40:12. In this Example, the mass ratio between $Pr_6O_{11}$ and Pd ($Pr_6O_{11}$/Pd) is 0.5.

Example 3

In this Example, an exhaust gas purifying catalyst (hereinafter referred to as "catalyst C"), in which the lower catalyst layer C1 (in an amount of 120 g per liter of the refractory three dimensional structure) and the upper catalyst layer A2 (in an amount of 81 g per liter of the refractory three dimensional structure) were formed on a cordierite substrate, was obtained in a manner similar to that in Example 1, except that the ingredients for preparing the first slurry c1 were weighed so that the mass ratio became as follows: Pd:$Pr_6O_{11}$:lanthana-alumina:ceria-zirconia:$BaSO_4$=6:6:56:40:12. In this Example, the mass ratio between $Pr_6O_{11}$ and Pd ($Pr_6O_{11}$/Pd) is 1.0.

Example 4

In this Example, an exhaust gas purifying catalyst (hereinafter referred to as "catalyst D") in which the lower catalyst layer D1 (in an amount of 126 g per liter of the refractory three dimensional structure) and the upper catalyst layer A2 (in an amount of 81 g per liter of the refractory three dimensional structure) were formed on a cordierite substrate was obtained in a manner similar to that in Example 1, except that the ingredients for preparing the first slurry d1 were weighed so that the mass ratio became as follows: Pd:$Pr_6O_{11}$:lanthana-alumina:ceria-zirconia:

$BaSO_4$=6:12:56:40:12. In this Example, the mass ratio between $Pr_6O_{11}$ and Pd ($Pr_6O_{11}$/Pd) is 2.0.

Comparative Example 1

In this Comparative Example, an exhaust gas purifying catalyst (hereinafter referred to as "catalyst E") in which the lower catalyst layer E1 (in an amount of 114 g per liter of the refractory three dimensional structure) and the upper catalyst layer A2 (in an amount of 81 g per liter of the refractory three dimensional structure) were formed on a cordierite substrate was obtained in a manner similar to that in Example 1, except that praseodymium nitrate was not added when the first slurry e1 was prepared. In this Comparative Example, the mass ratio between $Pr_6O_{11}$ and Pd ($Pr_6O_{11}$/Pd) is 0.

Example 5

In this Example, the method for preparing the first slurry f1 is different from that of Example 1. Specifically, in this Example, first, an aqueous palladium nitrate solution, praseodymium sol (containing 20 mass % of Pr in terms of $Pr_6O_{11}$ in the sol and containing 180 ppm of acetic acid and 1390 ppm of sulfuric acid in the sol), lanthana-alumina, ceria zirconia ($CeO_2$:$ZrO_2$=45:55), and barium sulfate were weighed so that the mass ratio became as follows: Pd:$Pr_6O_{11}$:lanthana-alumina:ceria-zirconia:$BaSO_4$=6:1.2:56:40:12. From this, in this Example, the mass ratio between $Pr_6O_{11}$ and Pd ($Pr_6O_{11}$/Pd) is 0.2.

The weighed lanthana-alumina was then dispersed in pure water (in an amount equivalent to twice the mass of the lanthana-alumina). A mixture of an aqueous palladium nitrate solution and praseodymium sol, which were mixed in advance, was added to the dispersed liquid, and the mixture was stirred for 10 minutes. The weighed ceria-zirconia and barium sulfate were then added to the solution, and the solution was subjected to wet milling in a ball mill. Thus, the first slurry f1 was prepared. After that, an exhaust gas purifying catalyst (hereinafter referred to as "catalyst F") in which the lower catalyst layer F1 and the upper catalyst layer A2 were formed on a cordierite substrate was obtained in a manner similar to the preparation method in Example 1.

Comparative Example 2

In this Comparative Example, the method for preparing the first slurry g1 is different from that of Example 1. Specifically, in this Comparative Example, first, an aqueous palladium nitrate solution, praseodymium nitrate, lanthana-alumina, ceria zirconia ($CeO_2$:$ZrO_2$=45:55), and barium sulfate were weighed so that the mass ratio became as follows: Pd:$Pr_5O_{11}$:lanthana-alumina:ceria-zirconia:$BaSO_4$=6:3:56:40:12. From this, in this Comparative Example, the mass ratio between $Pr_6O_{11}$ and Pd ($Pr_6O_{11}$/Pd) is 0.5.

The weighed lanthana-alumina was then dispersed in pure water (in an amount equivalent to twice the mass of the lanthana-alumina). The weighed aqueous palladium nitrate solution, ceria-zirconia, and barium sulfate were added to the dispersed liquid, and the mixture was stirred for 1 hour. Next, praseodymium nitrate was added and the mixture was subjected to wet milling in a ball mill. Thus, the first slurry g1 was prepared. After that, an exhaust gas purifying catalyst (hereinafter referred to as "catalyst G"), in which the lower catalyst layer G1 and the upper catalyst layer A2 were formed on a cordierite substrate, was obtained in a manner similar to the preparation method in Example 1.

<Confirmation of Formation of $Pr_2Pd_5O_2$>

X-ray diffractometry was carried out on each of the obtained catalysts A through G, and the ratio $C_{compo}$ of intensity ($I_{PrPdO}$) at 2θ=31.49° with respect to the Pd—Pr complex (represented by the rational formula of $Pr_2Pd_5O_2$) to intensity ($I_{PdO}$) at 2θ=33.29° with respect to PdO was calculated. The calculated results are shown in Table 1. Note that Table 1 also shows mass ratios of praseodymium to palladium ($Pr_6O_{11}$/Pd) each of which is a mass ratio between praseodymium and palladium contained in each of the catalysts and is calculated in terms of $Pr_6O_{11}$ and Pd.

As shown in Table 1, $Pr_2Pd_5O_2$ was formed in the catalysts A through D and F, whereas $Pr_2Pd_5O_2$ was not formed in the catalyst G. Moreover, since the catalyst E did not contain praseodymium, $Pr_2Pd_5O_2$ was not formed in the catalyst E.

TABLE 1

| Catalyst | $Pr_6O_{11}$/Pd | $C_{compo}$ |
|---|---|---|
| A | 0.2 | 0.04 |
| B | 0.5 | 0.13 |
| C | 1.0 | 0.22 |
| D | 2.0 | 1.12 |
| E | 0 | 0 |
| F | 0.2 | 0.06 |
| G | 0.5 | 0 |

<TEM-EDS Analysis>

Only the catalyst components of the obtained catalysts A through G were peeled off from the cordierite substrates and analyzed by TEM-EDS. In the catalysts A through D and the catalyst F, Pd, Pr and O were detected in the same particle, and Pr was not detected and Pd and O were detected in a particle different from the particle in which Pd, Pr, and O were detected. That is, PdO particles were present independently of Pd—Pr complex particles in the catalysts A through D and the catalyst F. On the other hand, in the catalyst E and the catalyst G, no particles were observed in which both Pd and Pr were detected.

<Thermal Aging Treatment>

The catalysts A through G were each subjected to thermal aging treatment. In the thermal aging treatment, first, each of the catalysts was placed at a location that was 25 cm downstream from an exhaust port of a 3.0-liter V-6 engine. At that time, the temperature of the catalyst bed was set to 1000° C.

Next, the engine was operated for 25 seconds with an A/F of 14.6 at the catalyst inlet, then fueling was stopped and the engine was operated for 2.5 seconds, and then the engine was operated for 2.5 seconds with the A/F of 12.0. This cycle was repeated, and the engine was eventually operated for 40 hours in total.

<Pd Particle Diameter after Thermal Aging Treatment>

Figure 1:
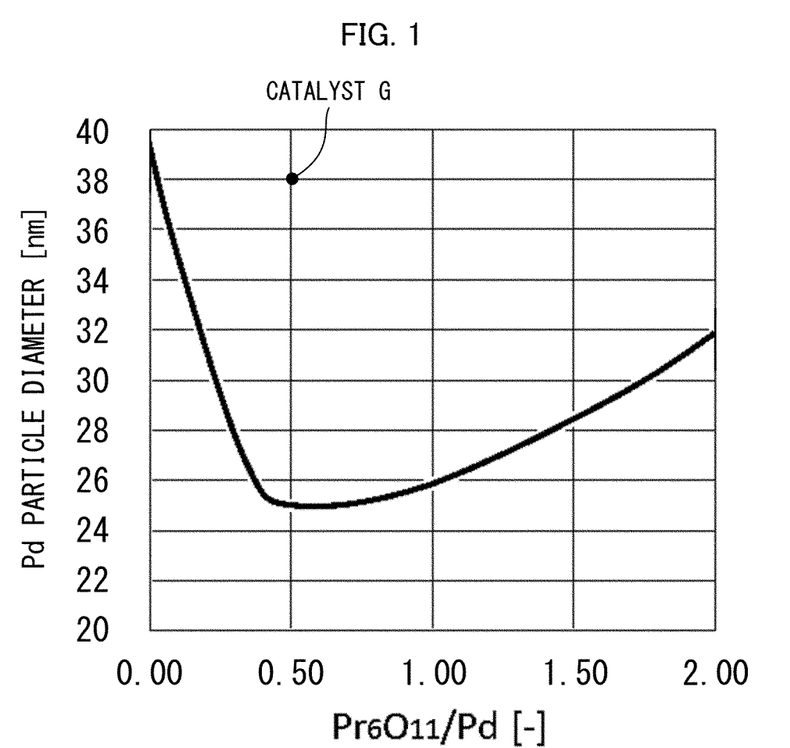
FIG. 1 is a graph showing Pd particle diameters after the thermal aging of catalysts in Examples 1 through 5 and Comparative Examples 1 and 2, in regard to an exhaust gas purifying catalyst of the present invention.

Pd particle diameters of the catalysts A through G after the thermal aging treatment were confirmed by an $O_2$—$CO_2$—$H_2$—CO pulse adsorption method. The results are shown in FIG. 1. FIG. 1 is a graph showing Pd particle diameters in the catalysts A through G after thermal aging treatment. As shown in FIG. 1, in the catalyst E containing no praseodymium, the Pd particle diameter after the thermal aging treatment was 40 nm whereas, in the catalysts A through D, F, and G containing praseodymium, the Pd particle diameters after the thermal aging treatment were 25 to 38 nm (note that, in FIG. 1, the catalysts A through F other than the catalyst G are on the same curve). That is, in the catalysts A through D, F, and G of the present invention containing praseodymium, it was possible to inhibit sintering of PdO when those catalysts were exposed to a high-temperature exhaust gas, and the Pd particle diameters after the thermal aging treatment became smaller than the Pd particle diameter of the catalyst E.

<Catalyst Performance Evaluation>

Figure 2:
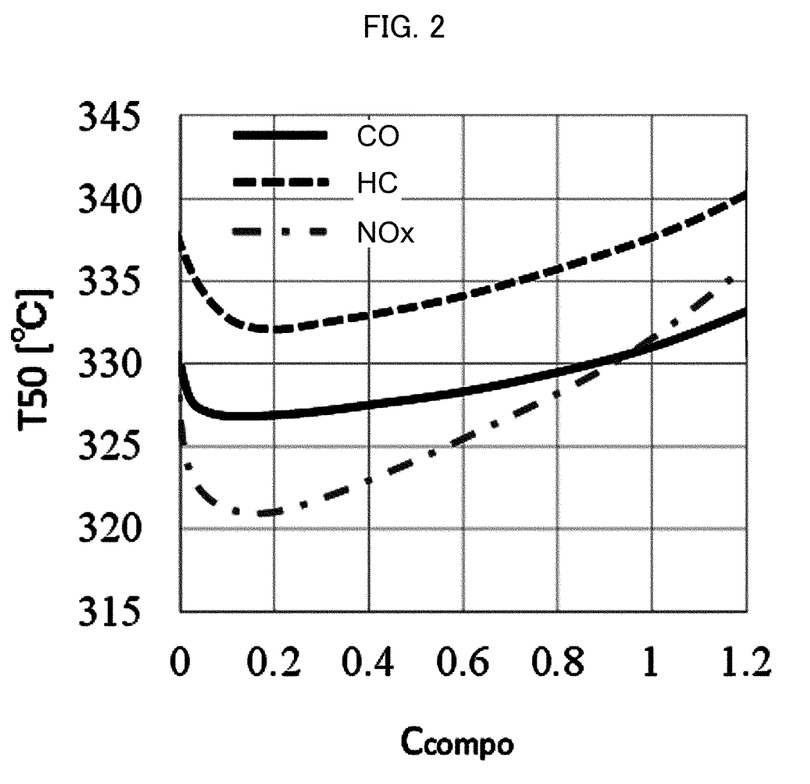
FIG. 2 is a graph showing the results of a catalyst performance evaluation of catalysts in Examples 1 through 5 and Comparative Examples 1 and 2, in regard to an exhaust gas purifying catalyst of the present invention.

Catalyst performance evaluation was carried out for each of the catalysts A through G. In the catalyst performance evaluation, each of the catalysts was first placed at a location 30 cm downstream from the exhaust port of a 2.4-liter straight-six engine. Next, the A/F at the catalyst inlet was set to 14.6, the temperature of the catalyst inlet was raised from 100° C. to 500° C., an exhaust gas was exposed to the catalyst, and the gas discharged from the catalyst outlet was sampled to calculate purification rates of CO, HC, and NOx. The catalyst performance of each of the catalysts was evaluated using T50, which is the temperature at which the purification rates of CO, HC, and NOx reach 50%. FIG. 2 is a graph in which the T50 of the catalysts A through G is plotted with respect to $Pr_6O_{11}/Pd$.

As shown in FIG. 2, values of T50 with respect to CO, HC, and NOx were low for the catalysts A through C and F whose ratio $C_{compo}$ ranged from 0.04 to 1.1. That is, it can be seen that the catalysts A through C and F have higher catalyst performance for purifying an exhaust gas.

[Recap]

In order to attain the objective, the exhaust gas purifying catalyst of the present invention contains a Pd—Pr complex and PdO, the Pd—Pr complex being represented by $Pr_aPd_bO_c$, where a=1 to 3, b=1 to 10, and c=1 to 6.

According to the above feature, even after the exhaust gas purifying catalyst is exposed to an exhaust gas at a high temperature for a long period of time, aggregation of Pd particles is inhibited because the Pd—Pr complex is formed. As a result, the exhaust gas purifying catalyst of the present invention can cause Pd to adsorb an exhaust gas even after exposure to an exhaust gas at a high temperature for a long period of time, and this makes it possible to maintain high catalyst activity over a long period of time.

In the exhaust gas purifying catalyst of the present invention, it is preferable that the mass ratio of praseodymium to palladium is 0.05 to 2.0, the mass ratio being calculated in terms of $Pr_6O_{11}$ and in terms of Pd.

In the exhaust gas purifying catalyst of the present invention, it is preferable that the ratio $C_{compo}$ of intensity $(I_{PrPdO})$ of an X-ray at a specific diffraction angle with respect to the Pd—Pr complex to intensity $(I_{PdO})$ of an X-ray at a specific diffraction angle with respect to the PdO in X-ray diffractometry is 0.04 to 1.1.

According to the configuration, higher catalyst performance can be achieved for a long period of time by improving the oxidizing performance of the PdO and improving the thermal durability by the Pd—Pr complex.

In the exhaust gas purifying catalyst of the present invention, it is preferable that the Pd—Pr complex is $Pr_2Pd_5O_2$.

In the exhaust gas purifying catalyst of the present invention, it is preferable that the exhaust gas purifying catalyst further includes at least one of rhodium and platinum.

In a method for purifying an exhaust gas of the present invention, an exhaust gas, including an exhaust gas in a high temperature zone, is purified with use of the above described exhaust gas purifying catalyst.

According to the features, it is possible to maintain the exhaust gas purification rate at a higher level over a longer period of time.

INDUSTRIAL APPLICABILITY

The exhaust gas purifying catalyst of the present invention can be suitably used in an internal combustion engine, in particular in a method for purifying the exhaust gas of a gasoline engine.

The invention claimed is:

1. An exhaust gas purifying catalyst comprising a Pd-Pr complex and PdO,
    said Pd-Pr complex being represented by $Pr_aPd_bO_c$, where a=1 to 3, b=1 to 10, and c=1 to 6.

2. The exhaust gas purifying catalyst according to claim 1, wherein:
    a mass ratio of praseodymium to palladium in said exhaust gas purifying catalyst is 0.05 to 2.0, the mass ratio being calculated in terms of $Pr_6O_{11}$ and in terms of Pd.

3. The exhaust gas purifying catalyst according to claim 1, wherein:
    a ratio $C_{compo}$ of intensity $(I_{prpdo})$ of an X-ray at a specific diffraction angle with respect to said Pd-Pr complex to intensity $(I_{Pdo})$ of an X-ray at a specific diffraction angle with respect to said PdO in X-ray diffractometry is 0.04 to 1.1.

4. The exhaust gas purifying catalyst according to claim 1, wherein said Pd-Pr complex is $Pr_2Pd_5O_2$.

5. The exhaust gas purifying catalyst according to claim 1, further comprising at least one of rhodium and platinum.

6. A method for purifying an exhaust gas, wherein:
    an exhaust gas, including an exhaust gas at a high temperature zone, is purified with use of the exhaust gas purifying catalyst according to claim 1.

* * * * *